(12) United States Patent
Oikarinen et al.

(10) Patent No.: US 8,983,953 B2
(45) Date of Patent: Mar. 17, 2015

(54) METHODS AND APPARATUSES FOR FACILITATING INTERACTION WITH A GEOHASH-INDEXED DATA SET

(75) Inventors: Matti Juhani Oikarinen, Wilmington, MA (US); David Gordon MacMillan, Burlington, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/275,955

(22) Filed: Oct. 18, 2011

(65) Prior Publication Data

US 2013/0097163 A1    Apr. 18, 2013

(51) Int. Cl.
*G06F 17/30* (2006.01)

(52) U.S. Cl.
CPC .............................. *G06F 17/30241* (2013.01)
USPC ........................................................ 707/736

(58) Field of Classification Search
CPC ................... G06F 17/30864; G06F 17/30867; G06F 17/30087
USPC ................................................. 707/723, 736
See application file for complete search history.

(56) References Cited

U.S. PATENT DOCUMENTS

| | | |
|---|---|---|
| 5,553,209 A | 9/1996 | Johnson et al. |
| 2009/0158185 A1* | 6/2009 | Lacevic et al. ................ 715/768 |
| 2010/0287207 A1* | 11/2010 | Motoyama .................... 707/803 |
| 2011/0145228 A1 | 6/2011 | Laurenzo et al. |
| 2012/0226889 A1* | 9/2012 | Merriman et al. ............ 711/216 |
| 2013/0073581 A1* | 3/2013 | Sandholm .................... 707/769 |

FOREIGN PATENT DOCUMENTS

| | | |
|---|---|---|
| GB | 2477306 A | 8/2011 |
| WO | WO-2007/027608 A2 | 3/2007 |
| WO | WO-2010/129766 A1 | 11/2010 |

OTHER PUBLICATIONS

Jay Hoover, How to Implement Geospatial Search Using Solr, Apr. 14, 2011, pp. 1-4.*
Geohash—Wikipedia, the free encyclopedia [online] [retrieved Aug. 11, 2011]. Retrieved from the Internet: <URL: http://en.wikipedia.org/wiki/Geohash>, 5 pages.
Local Lucene Geographical Search [online] [retrieved Aug. 11, 2011]. Retrieved from the Internet: <URL: http://www.nsshutdown.com/projects/lucene/whitepaper/locallucene_v2.html>. 5 pages.
Tips & Tricks—geohash.org [online] [retrieved Aug. 11, 2011]. Retrieved from the Internet: <URL: http://geohash.org/site/tips.html>. 3 pages.
International Search Report for Application No. PCT/FI2012/050972; dated Mar. 13, 2013.

* cited by examiner

*Primary Examiner* — Cam-Y Truong

(74) *Attorney, Agent, or Firm* — Alston & Bird LLP

(57) ABSTRACT

Methods and apparatuses are provided for facilitating interaction with a geohash-indexed data set. A method may include providing a geohash-indexed data set. The method may further include determining a density map indicating a density of indexed data items of the data set for each of a plurality of geohashes. Corresponding apparatuses are also provided.

16 Claims, 13 Drawing Sheets

| DRT3J | DRT3N | DRT3P |
|-------|-------|-------|
| DRT2V | DRT2Y (428) | DRT2Z |
| DRT2T | DRT2W | DRT2X |

424

432 → 430

| DRT2YP | DRT2YR | DRT2YX | DRT2YZ |
| DRT2YN | DRT2YQ | DRT2YW | DRT2YY |
| DRT2YJ | DRT2YM | DRT2YT | DRT2YV |
| DRT2YH | DRT2YK | DRT2YS | DRT2YU |
| DRT2Y5 | DRT2Y7 | DRT2YE | DRT2YG |
| DRT2Y4 | DRT2Y6 | DRT2YD | DRT2YF |
| DRT2Y1 | DRT2Y3 | DRT2Y9 | DRT2YC |
| DRT2Y0 | DRT2Y2 | DRT2Y8 | DRT2YB |

FIG. 4C

| DRT2YP = 0 | DRT2YR = 1 | DRT2YX = 2 | DRT2YZ = 3 |
|---|---|---|---|
| DRT2YN = 4 | DRT2YQ = 5 | DRT2YW = 6 | DRT2YY = 7 |
| DRT2YJ = 8 | DRT2YM = 9 | DRT2YT = 10 | DRT2YV = 11 |
| DRT2YH = 12 | DRT2YK = 13 | DRT2YS = 14 | DRT2YU = 15 |
| DRT2Y5 = 16 | DRT2Y7 = 17 | DRT2YE = 18 | DRT2YG = 19 |
| DRT2Y4 = 20 | DRT2Y6 = 21 | DRT2YD = 22 | DRT2YF = 23 |
| DRT2Y1 = 24 | DRT2Y3 = 25 | DRT2Y9 = 26 | DRT2YC = 27 |
| DRT2Y0 = 28 | DRT2Y2 = 29 | DRT2Y8 = 30 | DRT2YB = 31 |

FIG. 5A

METHODS AND APPARATUSES FOR FACILITATING INTERACTION WITH A GEOHASH-INDEXED DATA SET

TECHNOLOGICAL FIELD

Example embodiments of the present invention relate generally to computing technology and, more particularly, relate to methods and apparatuses for facilitating interaction with a geohash-indexed data set.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

As a result of the expansion in networks and evolution of mobile computing devices, mobile computing devices are increasingly being used to access data resources over networks. One such data resource that may be accessed over a network is a data set including data items having associated locations. For example, a data set may include a database of restaurants having an associated physical location. Thus, for example, a user may use his or her mobile device to search for restaurants near his present location. In order to facilitate searching the data set by location, also known as spatial querying, the data items may be indexed by geohashes, which may be used to encode the locations of the data items in the data set.

BRIEF SUMMARY

Methods, apparatuses, and computer program products are herein provided for facilitating interaction with a geohash-indexed data set. Methods, apparatuses, and computer program products in accordance with various embodiments may provide several advantages to computing devices, computing device users, data resource providers, and data query services. Some example embodiments provide for implementation of a density map indicating a density, or quantity, of data items of a geohash-indexed data set that are indexed by each of a plurality of geohashes. In accordance with some example embodiments, the density map may be used to facilitate querying the geohash-indexed set. More particularly, some example embodiments may use the density map to selectively retrieve data items so as to reduce the number of relatively costly data retrieval operations that may be performed. In this regard, the data map may be used to pre-evaluate a geohash that may satisfy a query location prior to performing a retrieval operation to retrieve data items that may be indexed by the geohash.

In a first example embodiment, a method is provided, which may comprise providing a geohash-indexed data set. The method of this example embodiment may further comprise determining a density map indicating a density of indexed data items of the data set for each of a plurality of geohashes.

In another example embodiment, an apparatus comprising at least one processor and at least one memory storing computer program code is provided. The at least one memory and stored computer program code may be configured, with the at least one processor, to cause the apparatus of this example embodiment to at least perform providing a geohash-indexed data set. The at least one memory and stored computer program code may be configured, with the at least one processor, to cause the apparatus of this example embodiment to further perform determining a density map indicating a density of indexed data items of the data set for each of a plurality of geohashes.

In another example embodiment, a computer program product is provided. The computer program product of this example embodiment includes at least one computer-readable storage medium having computer-readable program instructions stored therein. The program instructions of this example embodiment may comprise program instructions configured to cause an apparatus to perform a method. The method of this example embodiment may comprise providing a geohash-indexed data set. The method of this example embodiment may further comprise determining a density map indicating a density of indexed data items of the data set for each of a plurality of geohashes.

In another example embodiment, an apparatus is provided that may comprise means for providing a geohash-indexed data set. The apparatus of this example embodiment may further comprise means for determining a density map indicating a density of indexed data items of the data set for each of a plurality of geohashes.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
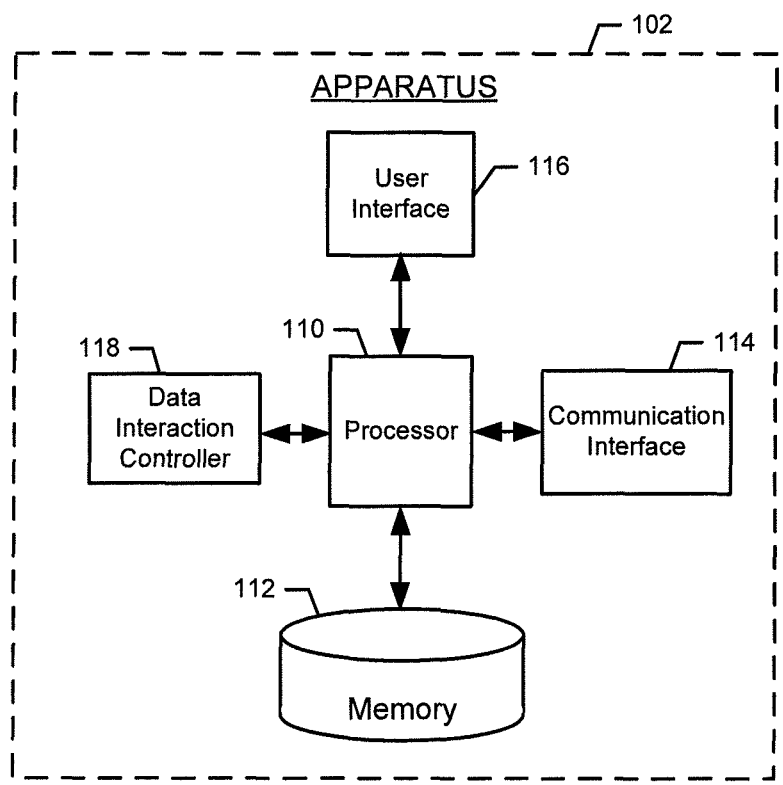
Figure 2:
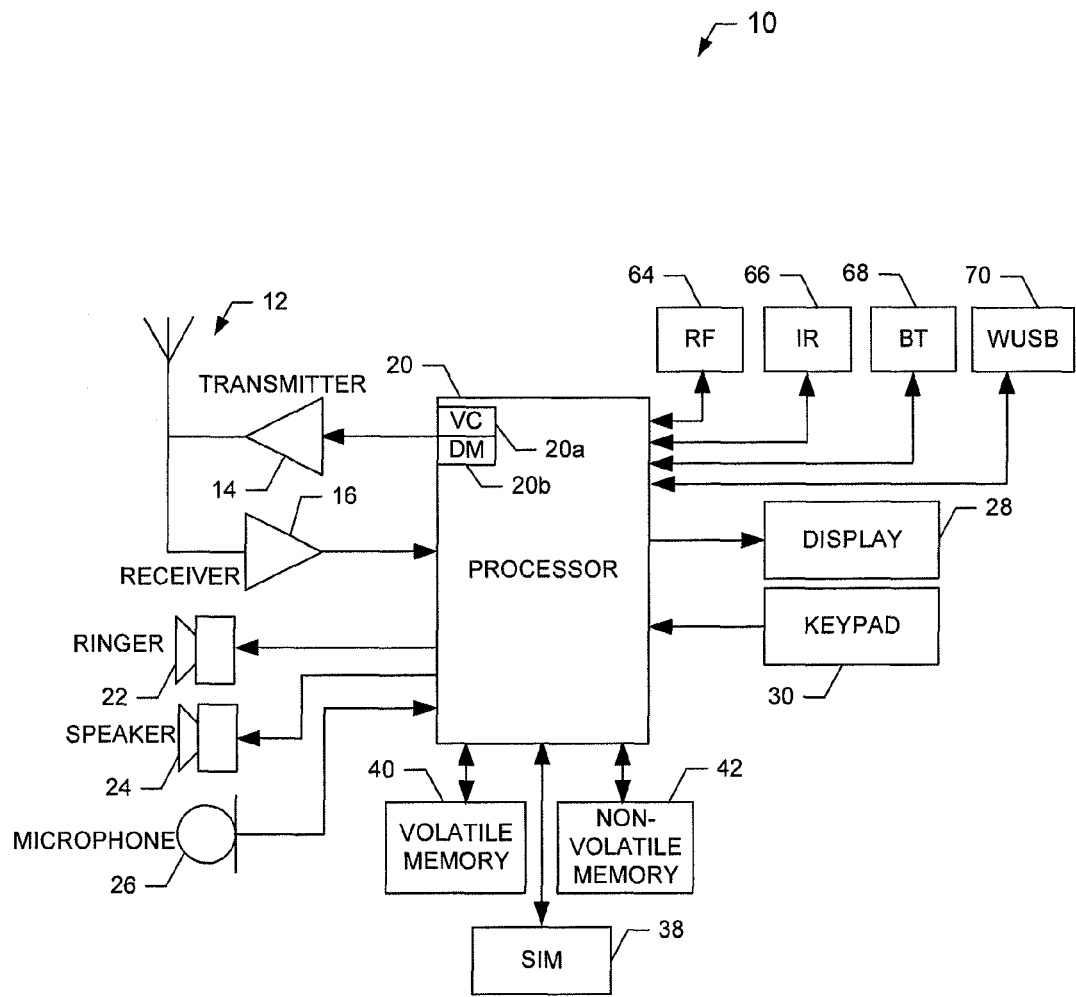
Figure 3:
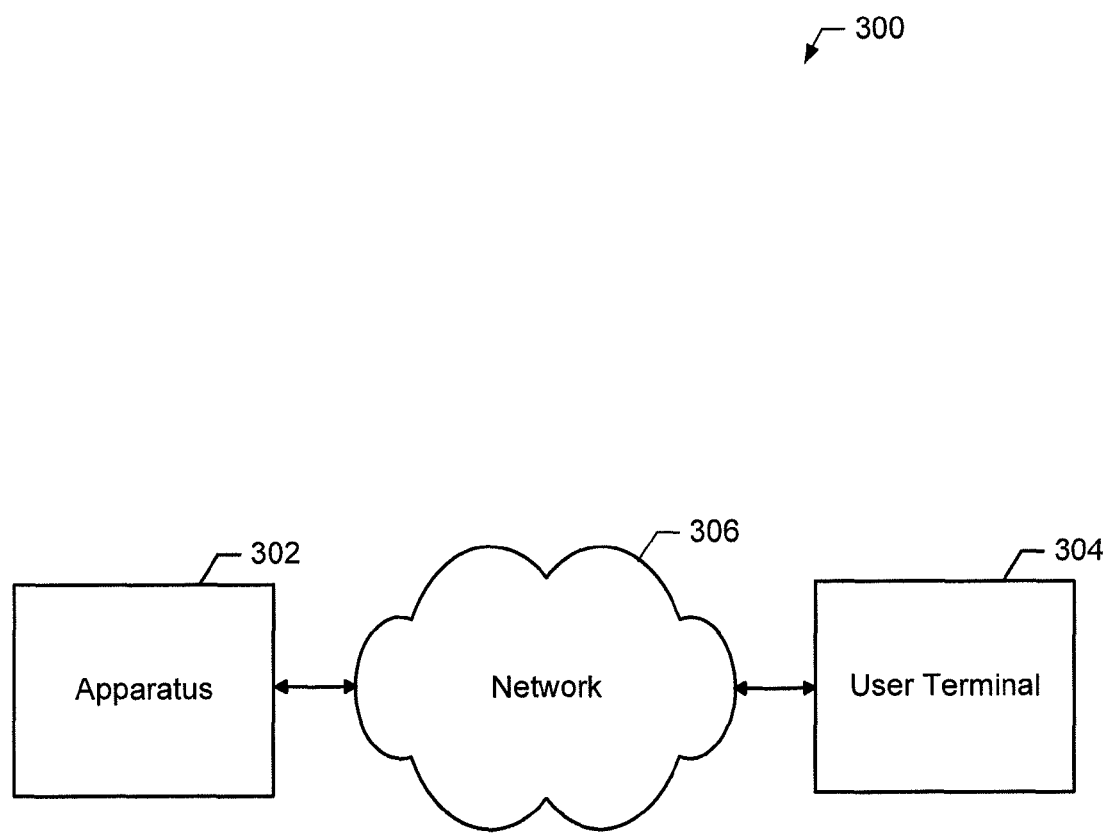
Figure 4A:
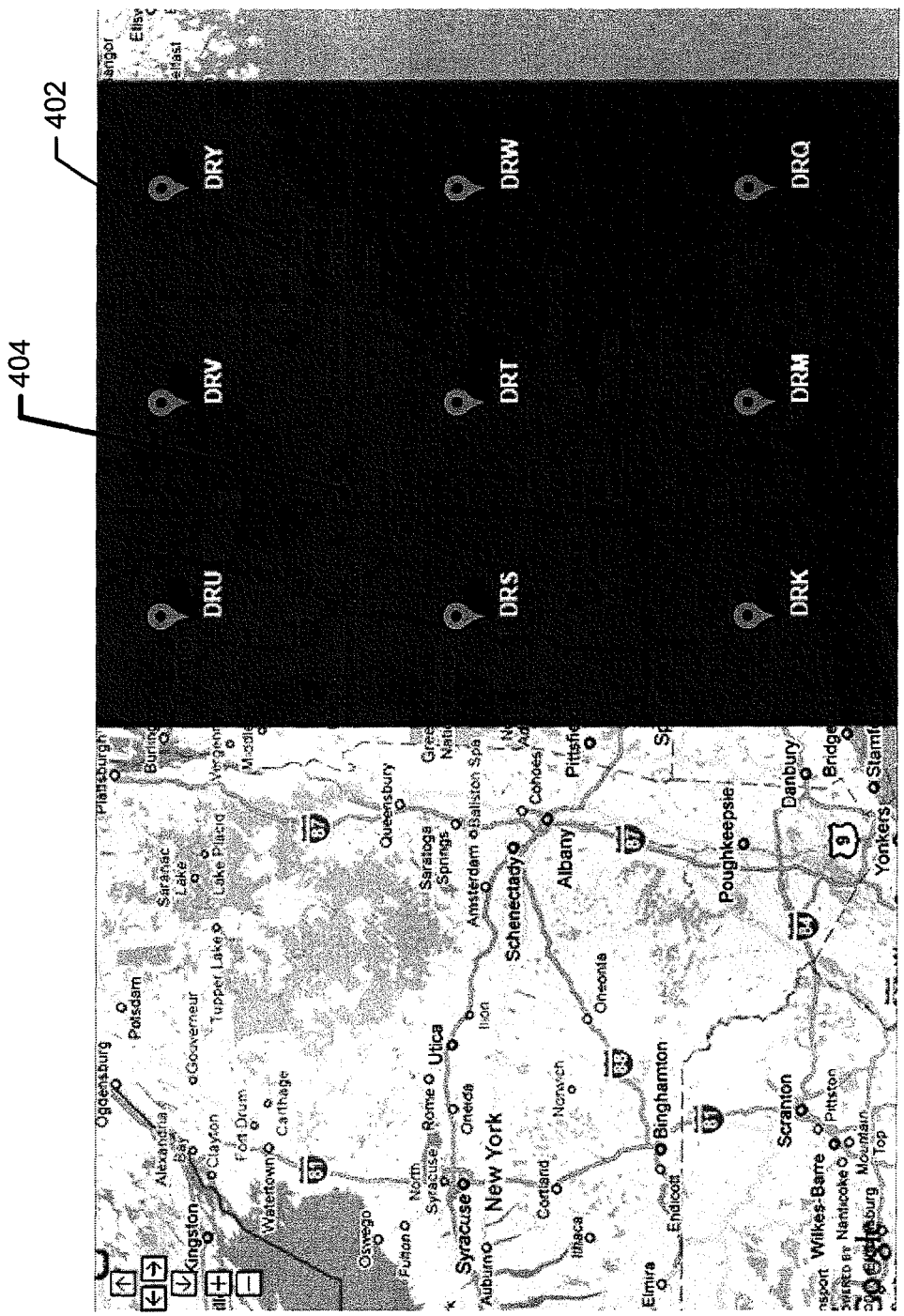
Figure 4B:
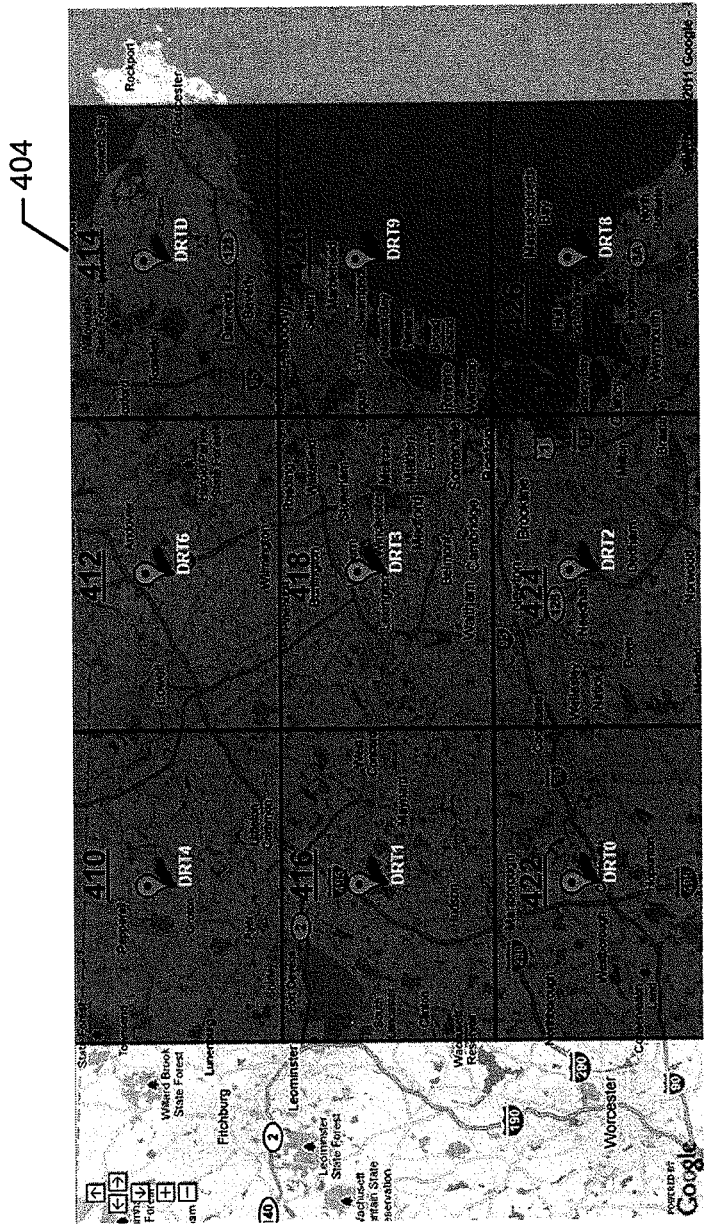
Figure 5B:
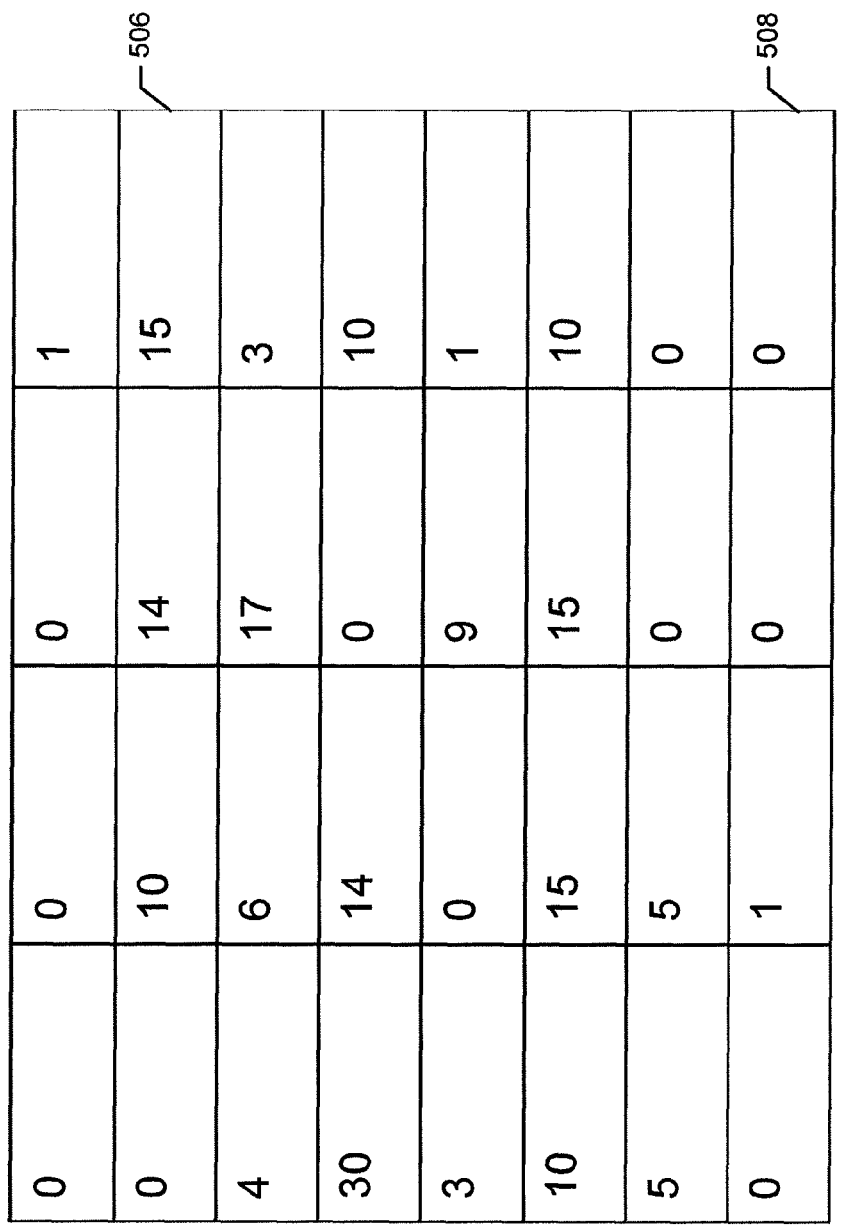
Figure 6:
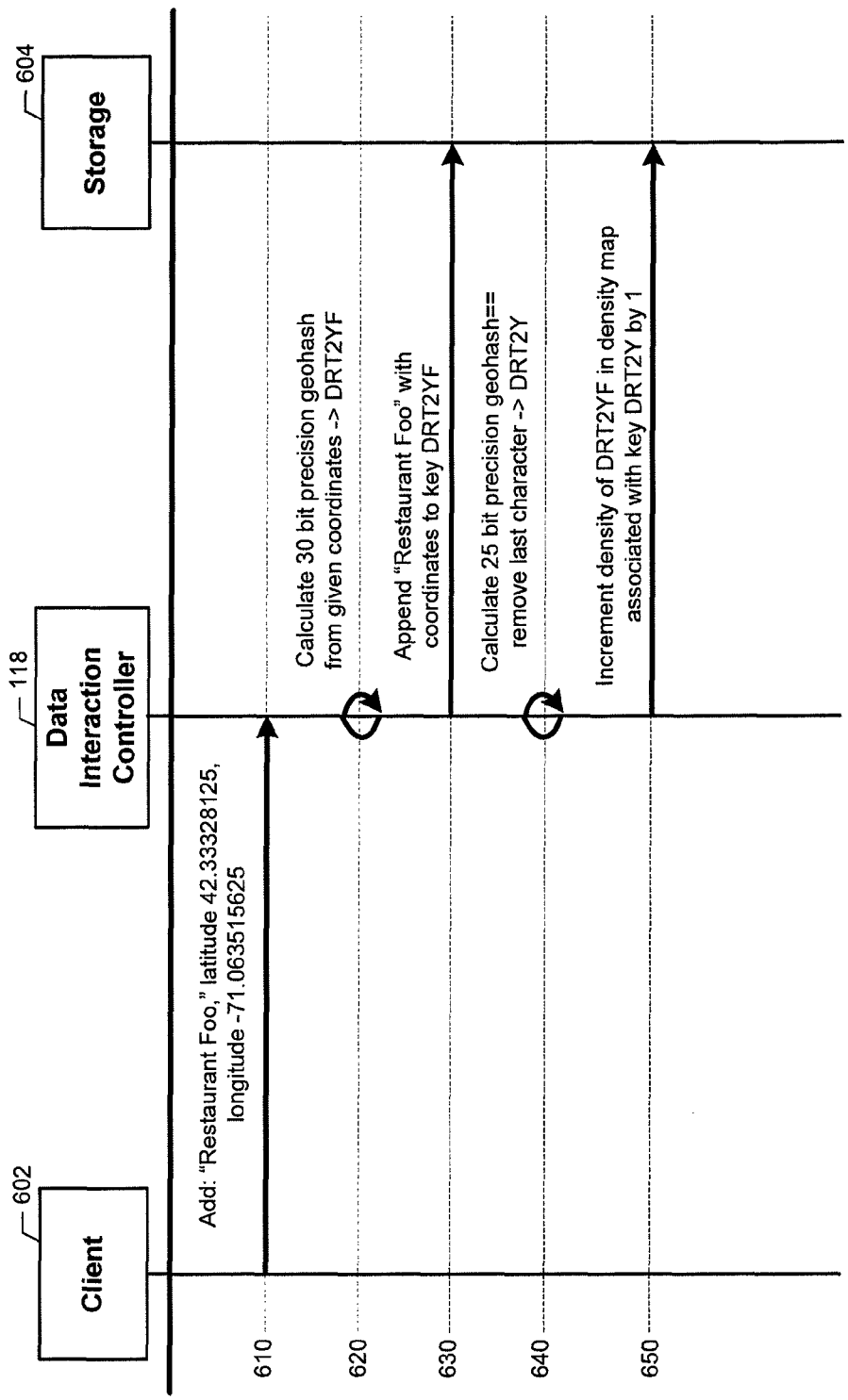
Figure 7:
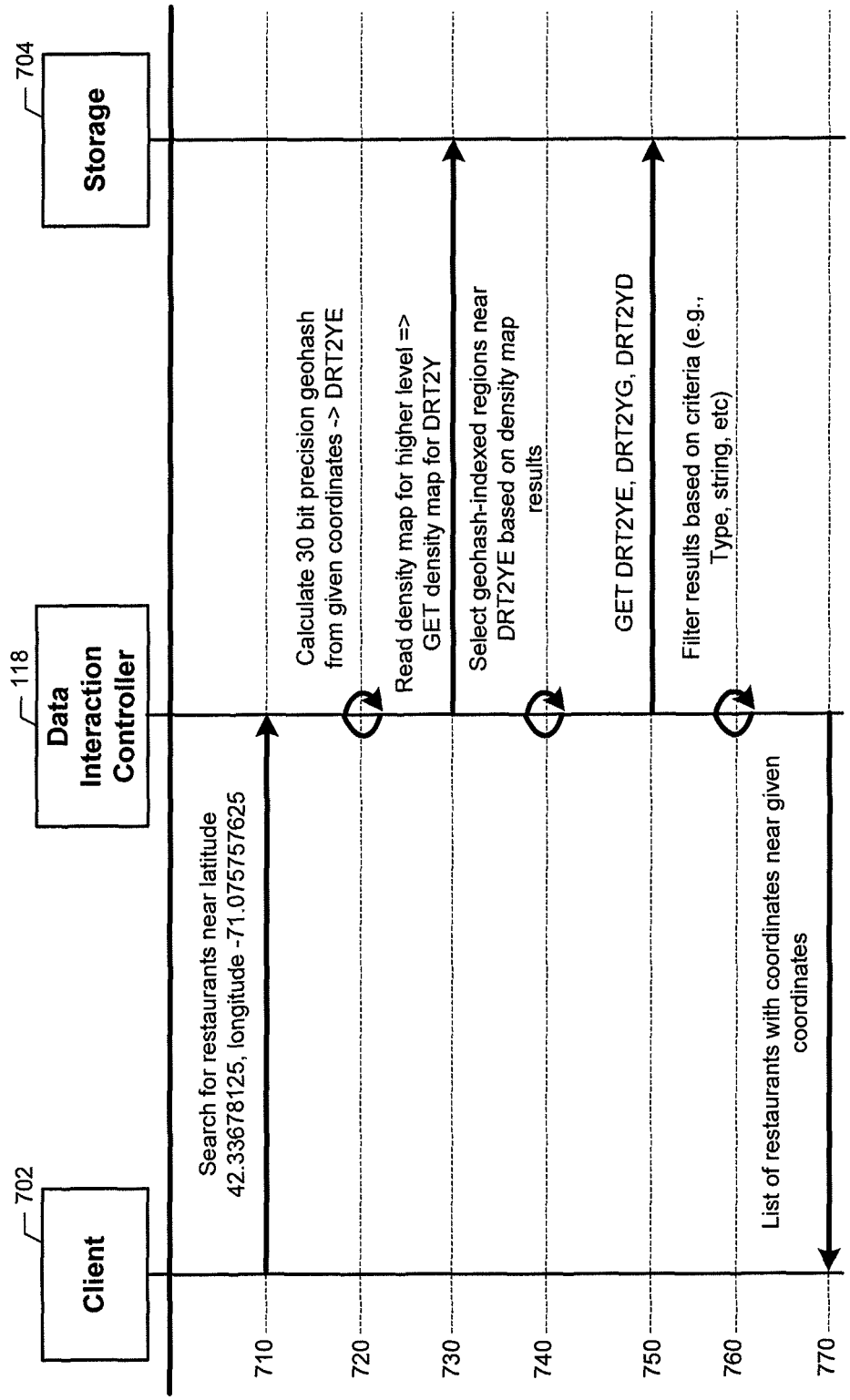
Figure 8:
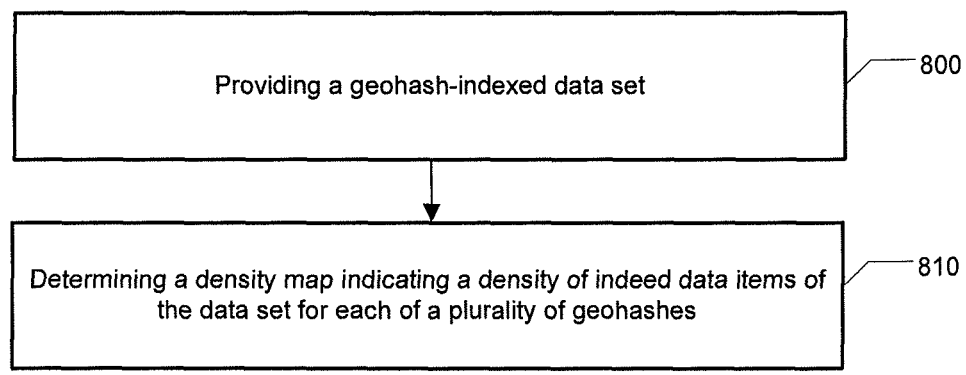
Figure 9:
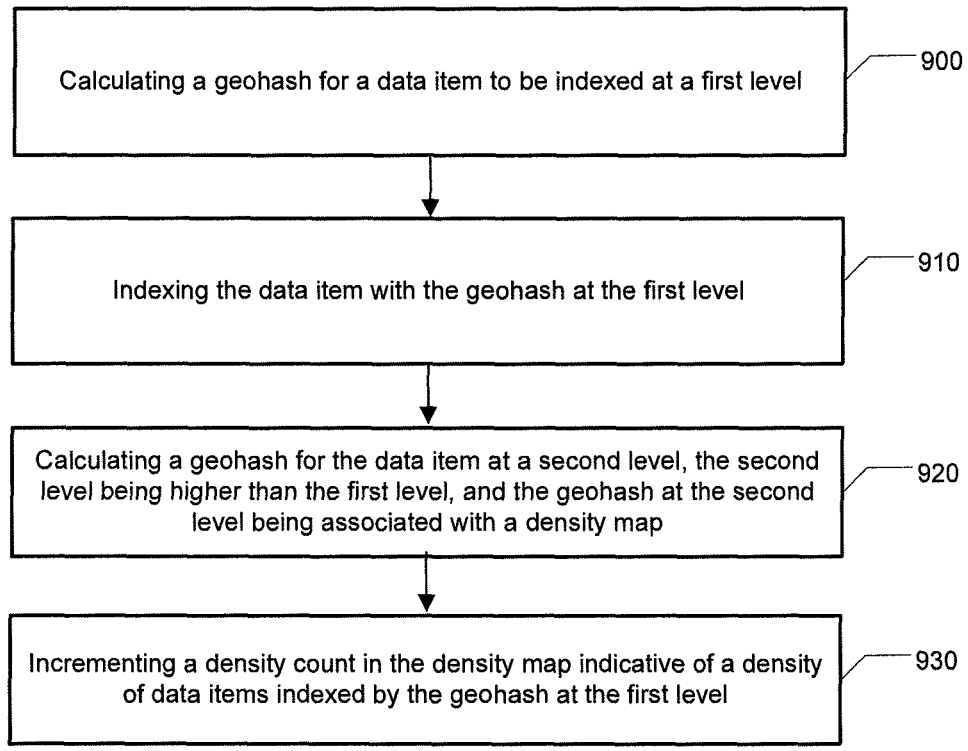
Figure 10:
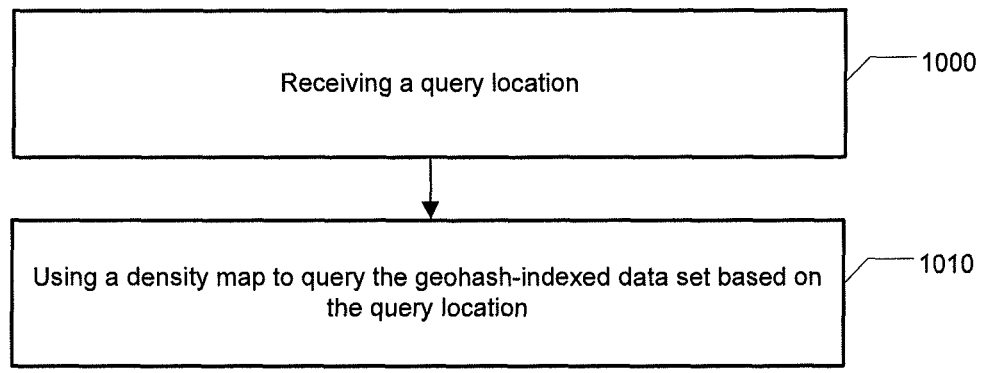

Having thus described embodiments of the invention in general terms, reference will now be made to the accompanying drawings, which are not necessarily drawn to scale, and wherein:

FIG. 1 illustrates a block diagram of an apparatus for facilitating interaction with a geohash-indexed data set according to some example embodiments;

FIG. 2 is a schematic block diagram of a mobile terminal according to some example embodiments;

FIG. 3 illustrates a system for facilitating interaction with a geohash-indexed data set according to some example embodiments;

FIGS. 4A-4C illustrate an example encoding of locations with geohashes according to some example embodiments;

FIGS. 5A-5B illustrates determination of a density map for a geohash-indexed data set according to some example embodiments;

FIG. 6 illustrates an example process flow for indexing a data item with a geohash and density map according to some example embodiments;

FIG. 7 illustrates an example process flow for querying a geohash-indexed data set using a density map according to some example embodiments;

FIG. 8 illustrates a flowchart according to an example method for facilitating interaction with a geohash-indexed data set according to some example embodiments;

FIG. 9 illustrates a flowchart according to an example method for indexing a data item according to some example embodiments; and FIG. 10 illustrates a flowchart according to an example method for querying a data set using a density map according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for facilitating interaction with a geohash-indexed data set according to some example embodiments. It will be appreciated that the apparatus 102 is provided as an example of some embodiments and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a geohash-indexed data set, other configurations may also be used to implement embodiments of the present invention.

The apparatus 102 may be embodied as one or more servers, a server cluster, a cloud computing infrastructure, one or more desktop computers, one or more laptop computers, one or more network nodes, multiple computing devices in communication with each other, a mobile terminal, mobile computer, mobile phone, mobile communication device, game device, digital camera/camcorder, audio/video player, television device, digital video recorder, positioning device, game controller, television controller, electronic device controller, chipset, a computing device comprising a chipset, any combination thereof, and/or the like. In this regard, the apparatus 102 may comprise any computing device or plurality of computing devices that is configured to facilitate interaction with a geohash-indexed data set based at least in part on a density map in accordance with one or more example embodiments. In some example embodiments, the apparatus 102 may be implemented on and/or may interact with a mobile computing device, such as the mobile terminal illustrated in FIG. 2.

In this regard, FIG. 2 illustrates a block diagram of a mobile terminal 10 representative of some example embodiments of an apparatus 102 and/or an apparatus that may interact with an apparatus 102. It should be understood, however, that the mobile terminal 10 illustrated and hereinafter described is merely illustrative of one type of apparatus that may implement and/or benefit from various embodiments of the invention and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), future communication, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. One or more of the volatile memory 40 or non-volatile memory 42 may be embodied as a tangible, non-transitory memory. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in some example embodiments, the apparatus 102 includes various means for performing the various functions herein described. These means may comprise one or more of a processor 110, memory 112, communication interface 114, user interface 116, or data interaction controller 118. The means of the apparatus 102 as described herein may be embodied as, for example, circuitry, hardware elements (e.g., a suitably programmed processor, combinational logic circuit, and/or the like), a computer program product comprising a computer-readable medium (e.g. memory 112) storing computer-readable program instructions (e.g., software or firmware) that are executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, and/or data interaction controller 118 may be at least partially embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some example embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to one or more example embodiments while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42. The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, a geohash-indexed data set, a density map corresponding to the geohash-indexed data set, and/or the like. This stored information may be stored and/or used by the data interaction controller 118 during the course of performing its functionalities.

The communication interface 114 may be embodied as any device or means embodied in circuitry, hardware, a computer program product comprising a computer readable medium (e.g., the memory 112) storing computer readable program instructions executable by a processing device (e.g., the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. By way of example, the communication interface 114 may be configured to receive data from and/or transmit data to another apparatus, such as a user terminal 304 (illustrated in FIG. 3), over a network (e.g., the network 306 illustrated in FIG. 3) to facilitate interaction with a geohash-indexed data set. The communication interface 114 may additionally be in communication with the memory 112, user interface 116, and/or data interaction controller 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some example embodiments, such as some example embodiments wherein the apparatus 102 is embodied on one or more servers, aspects of the user interface 116 may be more limited, or the user interface 116 may even be removed entirely. For example, in embodiments such as that illustrated in FIG. 3 wherein a user may access functionality provided by the apparatus 102 over a network (e.g., the network 306) from a remote user terminal (e.g., the user terminal 304), aspects of the user interface may be at least partially provided by the user terminal, rather than by the apparatus 102. In embodiments wherein the apparatus 102 includes a user interface, the user interface 116 may be in communication with the memory 112, communication interface 114, and/or data interaction controller 118, such as via a bus.

The data interaction controller 118 may be embodied as various means, such as circuitry, hardware, a computer program product comprising a computer readable medium (e.g., the memory 112) storing computer readable program instructions executable by a processing device (e.g., the processor 110), or some combination thereof and, in some embodiments, is embodied as or otherwise controlled by the processor 110. In embodiments wherein the data interaction controller 118 is embodied separately from the processor 110, the data interaction controller 118 may be in communication with the processor 110. The data interaction controller 118 may further be in communication with one or more of the memory 112, communication interface 114, or user interface 116, such as via a bus.

FIG. 3 illustrates a system 300 for facilitating interaction with a geohash-indexed data set according to some example embodiments. The system 300 may comprise an apparatus 302 and a user terminal 304 configured to communicate over the network 306. The apparatus 302 may, for example, comprise an embodiment of the apparatus 102 wherein the apparatus 102 is configured to communicate with a remote user terminal 304 over a network 306 to facilitate interaction with a geohash-indexed data set by the user terminal 304.

The user terminal 304 may comprise any computing device by which a user may access a content source over a network. In this regard, the user terminal 304 may comprise any device by which a user may access services that may be provided by the apparatus 302 to facilitate interaction with a geohash-indexed data set, such as querying the geohash-indexed data set. By way of example, the user terminal 304 may comprise, for example, a desktop computer, laptop computer, mobile terminal, mobile computer, mobile phone, mobile communication device, mobile terminal 10, audio/video player, any combination thereof, and/or the like. The network 306 may comprise a wireline network, wireless network (e.g., a cellular network, wireless local area network, wireless wide area network, some combination thereof, or the like), or a combination thereof, and in one embodiment comprises the internet.

Accordingly, it will be appreciated that where the data interaction controller 118 is described to receive a query, such as a query location, for querying a geohash-indexed data set in accordance with one or more example embodiments, that query may be provided locally to the apparatus 102, and/or may be received over a network. Thus, for example, a query may be provided locally to the apparatus 102 via the user interface 116. Additionally or alternatively, a query by a user of a user terminal 304 may be received by the communication interface 114 via the network 306. Similarly, it will be appreciated that where the data interaction controller 118 is described to cause retrieved data items as query results, those results may be provided via the user interface 116, and/or may be provided to a remote user terminal 304 such that they may be displayed or otherwise provided to a user of the user terminal 304 by the user terminal 304.

In some example embodiments, the data interaction controller 118 may be configured to manage and/or access a data set that may be geohash-indexed. The data set may, for example, be stored on the memory 112. However, it will be appreciated that the data set may be stored on any storage that may be accessible by the apparatus 102 including, for example, a remote network accessible storage, such as may be accessible via the network 306.

The geohash-indexed data set of some example embodiments may comprise a plurality of data items having respective associated locations. For example, a data set may comprise a database of restaurants in a given area. Each restaurant may have a respective associated location, such as a street address, latitude/longitude coordinates, and/or the like. The geohash encoding of a location may define a geographical region in which the location sits. The geographical region referenced by a geohash may, for example, comprise a rectangular area. However, it may be appreciated that a geohash may reference a geographical region a non-rectangular shape in some example embodiments. Precision may be increased by successively dividing a geographical region into smaller and smaller nested regions (e.g., nested rectangles). With increased precision, the length of the geohash may increase while retaining the original encoding of the containing larger region as a prefix. For example, the geohash referencing a 20 square Km area may be "DRT2Y," while the lower level geohash referencing a 1 square Km area lying within the area referenced by DRT2Y may be "DRT2YF." Accordingly, it may be seen that a geohash more precisely indexing a location (e.g., a lower level geohash) may comprise a suffix added to a geohash referencing a larger containing area (e.g., a higher level geohash). Thus, by this property, a less precise geohash for a location may be calculated by determining a prefix of a more precise geohash that conveys a desired level of precision.

FIGS. 4A-4C illustrate an example encoding of locations with geohashes according to some example embodiments. Referring first to FIG. 4A, a map of part of the Northeastern United States is illustrated. A portion 402 of the mapped region has been divided into 9 geographic regions represented by geohashes, including the region 404, which includes the city of Boston and is referenced by the geohash "DRT." It may be seen from the map that the region referenced by the geohash DRT is relatively large, including large portions of Massachusetts and New Hampshire, as well as a portion of the Atlantic Ocean.

Referring to FIG. 4B, the region 404 has been divided into several nested regions referenced by geohashes. These regions are each referenced by a geohash including the prefix DRT referencing the region 404 and having extra length, which provides the more precise region. Thus, as may be seen in FIG. 4B, the region 410 is referenced by the geohash DRT4, the region 412 by the geohash DRT6, the region 414 by the geohash DRTD, the region 416 by the geohash DRT1, the region 418 by the geohash DRT3, the region 420 by the geohash DRT9, the region 422 by the geohash DRT0, the region 424 by the geohash DRT2, and the region 4126 by the geohash DRT8.

FIG. 4C illustrates that the region 424 may be further subdivided into several nested regions referenced by geohashes, including the region 428 referenced by the geohash DRT2Y. The region 428 may be further divided into several regions (collectively labeled 430 in FIG. 4C). The regions 430 may be referenced by respective geohashes, with each smaller nested region referenced by progressively longer geohashes while maintaining the prefix of the geohash referencing the parent region(s). Accordingly, it may be seen that various levels of precision may be obtained by increasing/decreasing the length of a geohash, with longer (e.g., more precise) geohashes referencing smaller, or more fine level, geographic regions.

A geohash may be used to index a data item in a data set with a desired level of precision. For example, a restaurant located within a geographic region referenced by geohash DRT2YX (labeled 432 in FIG. 4C) may be indexed with DRT2YX, DRT2Y, DRT2, DRT, DR, and/or D. In this regard, a higher, or more course, level geohash referencing a geographic region including the restaurant's location may be calculated by truncating a suffix from a more precise, lower level geohash.

A geohash-indexed data set may be queried using a geohash to retrieve data items indexed by that geohash (e.g., indexed data items having an associated location within the geographic region referenced by that geohash). In this regard, a geohash may serve as a key for querying the geohash-indexed data set for data items indexed by the geohash. However, proximity-based querying for results proximate to a location may require querying the geohash-indexed data set for multiple geohashes, such as in instances in which the query location is near the edge of a region referenced by a geohash or where the desired proximity encompasses multiple regions. These queries may be relatively expensive from a computational standpoint, and in some cases potentially from a standpoint of utilization of network bandwidth.

In some example embodiments, the data interaction controller 118 may be configured to determine a density map indicating a density of indexed data items for each of a plurality of geohashes. In this regard, a density of indexed items for a geohash may comprise a quantity (e.g., a count) of data items that are indexed by the geohash. In some example embodiments, the data interaction controller 118 may use a density map to facilitate proximity-based querying and/or other interaction with a geohash-indexed data set.

In some example embodiments, a density of indexed data items may be determined for each of a plurality of geohashes at a first level. The resulting density map may be stored in association with a higher level geohash that references a region encompassing the geographic regions referenced by the plurality of geohashes at the first level.

Using the example of FIGS. 4A-4C, a density map may be determined that may indicate the density of indexed data items for the geohashes referencing each of the regions 430. This density map may be associated with the higher level geohash DRT2Y referencing the region 428, which includes the regions referenced by the lower level geohashes referencing the regions 430. Thus, using the above example, the geohash DRT2Y may serve as a key for storing the density map for the geohashes referencing the regions 430.

FIG. 5A illustrates an example assignment of index numbers (e.g., 0-31) to the 32 regions 430 from FIG. 4C, which may be used as indexes to an array or other data structure containing the corresponding density map indicating the density of indexed data items for the regions 430. As illustrated in FIG. 5A, the geohash DRT2YY 502 may be assigned the index number 7 into a data structure containing the density map. In this regard, the index number 7 may be used to store and/or look up the density of data items indexed by the geohash DRT2YY 502. Similarly, as another example, the geohash DRT2YB 504 may be assigned the index number 31 into the data structure containing the density map. Thus, the index number 31 may be used to store and/or look up the density of data items indexed by the geohash DRT2YB 504.

Referring to FIG. 5B, an example density map for the regions 430, such as may be stored in an array structure according to some example embodiments is illustrated. Each element of the array structure may comprise a density value indicating a density of indeed data items for a respective geohash. For example, the density value 506 may indicate that there are 15 data items indexed by the geohash DRT2YY 502. In this regard, the index number 7 illustrated in FIG. 5A may be used to look up the density of data items indexed by geohash DRT2YY 502 in the density map of FIG. 5B. As another example, the density value 508 may indicate that there are 0 data items indexed by the geohash DRT2YB 504. In this regard, the index number 31 illustrated in FIG. 5A may be used to look up the density of data items indexed by geohash DRT2YB 504 in the density map of FIG. 5B.

It will be appreciated that the example assignment of index numbers and density map structure illustrated in and described with respect to FIGS. 5A and 5B is provided purely by way of example, and not by way of limitation. In this regard, other indexing schemes and/or alternative data structures may be used for implementation of a density map within the scope of the disclosure. For example, in some example embodiments, rather than mapping a density of indexed data items for each respective geohash, the density map may be modeled by storing count→geohash mappings. Thus, for example, using the example of FIGS. 4A-4C and example indexing and density data from FIGS. 5A and 5B, a density map that may be associated with the higher level geohash DRT2Y referencing the region 428 may include the following Count|Geohash index mapping:

0|0, 1, 2, 4...
1|3, 19, 29
3|11, 16
...

Note that the above example density map does not include a count value of 2 because no geohashes in the example have a density of 2.

In some example embodiments, a density map may be determined at each of a plurality of geohash levels. Thus, for example, a density map may be associated with the geohash DRT referencing the region 404 illustrated in FIG. 4A, which may include densities for the regions 410-426 illustrated in FIG. 4B in addition to a density map being associated with geohash DRTY referencing the region 428, which may include densities for the regions 430 illustrated in FIG. 4C.

Further, while the above examples have been described having a density map stored in association with a geohash having one level higher granularity than the geohashes for which density data is mapped, the density map may be stored in association with a geohash having two or more levels higher granularity than the geohashes for which density data is mapped. Thus, for example, where in the above examples the density map was stored in association with a geohash 5 bits more course (e.g., in association with geohash DRT2Y) than the density data (e.g., for geohash DRT2YP), the density map could instead be stored in association with a geohash having a 20 bit granularity (e.g., geohash DRT2), but mapping directly to a geohash having a 30 bit level of granularity (e.g., DRT2YP). Accordingly, where storage of a density map in association with a level having a 5 bit difference in granularity may result in a density map having 32 elements, a 10 bit difference may result in a density map having 1024 (e.g., 32*32=1024) elements.

In some example embodiments, the difference in the number of levels of granularity between the level of geohashes for which density data is mapped and the level of geohash in association with which the density map is stored may be determined based on the density of indexed data items. For example, when a density of indexed data items is sparser, the density map may be stored at a higher level of granularity than for instances in which there is a greater density of indexed data items.

In some example embodiments, the data interaction controller 118 may be configured to index a data item with a geohash and increment a corresponding density count in a density map to reflect the newly indexed item. FIG. 6 illustrates an example process flow for indexing a data item with a geohash and density map according to some example embodiments. In this regard, FIG. 6 illustrates interactions that may occur between a client 602, data interaction controller 118, and storage 604 for indexing a data item with a geohash and incrementing a corresponding density count in a density map to reflect the newly indexed item. The client 602 may comprise any device, user, service, and/or other entity using the geohash-indexed data set. Thus, for example, the client 602 may comprise a user interacting with the user interface 116, a user terminal 304, and/or the like. The storage 604 may comprise any memory, storage device, and/or the like in which the geohash-indexed data set may be stored. Thus, for example, the storage 604 may comprise the memory 112, a storage device that may be accessible to the apparatus 102 via the network 306, and/or the like.

Operation 610 may comprise the client 602 providing a data item having an associated location to be indexed. In the example of FIG. 6, "Restaurant Foo" is provided for addition to a data set comprising restaurants. Restaurant Foo has a location of latitude 42.33328125, longitude −71.063515625. While in this example, the provided location is couched in terms of latitude/longitude coordinates, it will be appreciated that in various embodiments the provided associated location may additionally or alternatively comprise a street address and/or other indication of a location. Operation 620 may comprise the data interaction controller 118 calculating a geohash for the Restaurant Foo at a first level. In the example of FIG. 6, the data interaction controller 118 may calculate a 30 bit precision geohash from the given coordinates, which may, for example, be DRT2YF. Operation 630 may comprise the data interaction controller 118 causing the Restaurant Foo and associated coordinates to be appended to the key DRT2YF such that the Restaurant Foo is indexed by DRT2YF and stored in the storage 604. Operation 640 may comprise the data interaction controller 118 calculating a geohash for the Restaurant Foo at a second level that is higher than the level calculated in operation 620. In the example of FIG. 6, the data interaction controller 118 may calculate a 20 bit precision geohash from the given coordinates, which may, for example, be DRT2Y. The geohash at the second level may be associated with a density map. Operation 650 may comprise the data interaction controller 118 incrementing the density of geohash DRT2YF in the density map associated with DRT2Y by 1 to reflect the addition of Restaurant Foo.

In some example embodiments, the data interaction controller 118 may be configured to use a density map to facilitate querying a geohash-indexed data set. In this regard, the data interaction controller 118 may be configured to receive a query location and use the density map to query the geohash-indexed data set based at least in part on the query location. The query location may, for example comprise a street address, coordinates, neighborhood, city, state, region, and/or the like.

FIG. 7 illustrates an example process flow for querying a geohash-indexed data set using a density map according to some example embodiments. In this regard, FIG. 7 illustrates interactions that may occur between a client 702, data interaction controller 118, and storage 704 for using a density map to query a geohash-indexed data set according to some example embodiments. The client 702 may comprise any device, user, service, and/or other entity using the geohash-indexed data set. Thus, for example, the client 702 may comprise a user interacting with the user interface 116, a user terminal 304, and/or the like. The storage 704 may comprise any memory, storage device, and/or the like in which the geohash-indexed data set may be stored. Thus, for example, the storage 704 may comprise the memory 112, a storage device that may be accessible to the apparatus 102 via the network 306, and/or the like.

Operation 710 may comprise the client 702 providing a query location and optionally one or more additional query parameters, such as a type(s) of data item to be retrieved. In the example of FIG. 7, "the client 702 may query the geohash-indexed data set for restaurants near latitude 42.33678125, longitude −71.075757625. While in this example, the query location is couched in terms of latitude/longitude coordinates, it will be appreciated that in various embodiments the query location may additionally or alternatively comprise a street address, neighborhood, city, state, region, and/or the like. Operation 720 may comprise the data interaction controller 118 determining a geohash corresponding to the query location at a first level. In the example of FIG. 7, the data interaction controller 118 may calculate a 30 bit precision geohash from the given coordinates, which may, for example, be DRT2YE. Operation 730 may comprise the data interaction controller 118 determining a geohash corresponding to the query location at a second level. The second level may be higher than the first level, and the determined geohash at the second level may be associated with a density map including a density for the region referenced by the geohash at the first level determined in operation 720. In the example of FIG. 7, the determined geohash may comprise DRT2Y. This geohash may, for example, be determined by truncating the last 5 bits of the geohash DRT2YE. Operation 730 may further comprise the data interaction controller accessing and reading at least a portion of the density map associated with geohash DRT2Y from the storage 704. In this regard, the data interaction controller 118 may, for example, read the density map to determine densities of indexed items for the geohash corresponding to the query location at the first level (e.g., DRT2YE) and for one or more further geohashes at the first level. The one or more further geohashes at the first level may reference geographic regions adjacent to and/or within a defined proximity of the geographic region referenced by the geohash corresponding to the query location at the first level.

Operation 740 may comprise the data interaction controller 118 selecting to retrieve data items indexed by one or more of the geohashes at the first level based at least in part on the densities read from the density map. In this regard, the data interaction controller 118 may, for example, select to retrieve data items indexed by one or more of the geohash corresponding to the query location at the first level (e.g., DRT2YE) or one or more of the further geohashes at the first level. The geohashes selected for retrieval may be selected based on any of a variety of criteria, some of which are discussed further herein below. In the example illustrated in FIG. 7, the data interaction controller 118 has selected to retrieve data items indexed by the geohashes DRT2YE, DRT2YG, and DRT2YD, which may be retrieved from the storage 704 in Operation 750.

Operation 760 may optionally comprise the data interaction controller filtering the retrieved results based on one or more query criterion that may be provided in addition to the query location. For example a query criterion specifying a desired type of result may be provided. For example, if the data set comprises more than restaurants, the retrieved results may be filtered to determine the data items corresponding to restaurants. As another example, if the client only wishes to retrieve results for That restaurants, the data interaction controller 118 may filter retrieved restaurant data items for those corresponding to That restaurants.

Operation 770 may comprise the data interaction controller 118 causing the query results to be provided to the client 702. In the example illustrated in FIG. 7, the data interaction controller 118 may cause the filtered list of restaurants with coordinates near the query location coordinates to be provided to the client 702. Accordingly, by way of non-limiting example, the query results may be provided to the client 702 for display, emailed to the client 702, and/or the like.

In some example embodiments the data interaction controller 118 may be configured to select whether to retrieve data items indexed by a geohash based at least in part on determining to retrieve data items indexed from one or more geohashes cumulatively indexing enough data items to satisfy a search result quantity criterion. Accordingly, for example, if the search is to return at least 20 results, the data interaction controller 118 may analyze a density map to identify one or more regions proximate to the query location referenced by geohashes that cumulatively index at least 20 results. For example, the data interaction controller 118 may retrieve data items indexed by a geohash referencing a region including the query location and data items indexed by one or more geohashes referencing regions neighboring and/or within a defined proximity of the region including the query location such that the number of retrieved data items satisfies a search result quantity criterion.

In some example embodiments, the data interaction controller 118 may be configured to select whether to retrieve data items indexed by a geohash based at least in part on whether the density for the geohash satisfies a threshold number. For example, a threshold number may be set to 1, such that a retrieval operation is not performed for a geohash that does not index any data items. In this regard, the density map may lend foresight to the number of data items indexed by a geohash such that a relatively costly retrieval operation may not need to be performed if it is known in advance that a geohash does not index any data items. Using the example of geohash-referenced regions around the City of Boston, as illustrated in FIGS. 4A-4C, multiple geohashes may reference regions wholly or largely encompassing the ocean rather than a landmass. Accordingly, retrieval operations for geohashes referencing such regions that may not contain any data items may be avoided.

In some example embodiments, the data interaction controller 118 may be configured to select to retrieve data items indexed by geohashes having either the highest or lowest densities. For example, the data interaction controller 118 may be configured to retrieve data items for a predefined number of geohashes that have either the most or the fewest (e.g., depending on the query criteria) number of indexed data items among the geohashes referencing regions satisfying the query location. For example, a data set may comprise a crime database and a user may desire to retrieve crime statistics for regions within or proximate to a query location that have the lowest crime rates. Accordingly, the data interaction controller 118 may be configured to use a density map to identify the geohashes indexing the fewest data items (e.g., those regions with the lowest crime rates) that satisfy the query location.

In some example embodiments, the data interaction controller 118 may be configured to use a density map to validate a query location prior to retrieving any indexed data items. In this regard, for example, a search criterion may be configured such that a query should not retrieve less than a predefined minimum number of results and/or more than a predefined maximum number of results. The data interaction controller 118 may accordingly be configured in some example embodiments to determine based at least in part on a density map whether a number of data items that would be retrieved based on the query location would fail to satisfy a threshold parameter(s) (e.g., a predefined minimum number of results and/or more than a predefined maximum number of results). The data interaction controller 118 may be configured to only retrieve a data item based on the query location in an instance in which it is determined that the number of data items that would be retrieved based on the query location would satisfy the threshold parameter(s). In some such example embodiments, the data interaction controller 118 may be configured to cause a user to be prompted to refine the query location in an instance in which it is determined that the number of data items that would be retrieved based on the query location would not satisfy the threshold parameter. Accordingly, the user may revise the query location such that fewer or more results would be retrieved.

FIG. 8 illustrates a flowchart according to an example method for facilitating interaction with a geohash-indexed data set according to some example embodiments. The operations illustrated in and described with respect to FIG. 8 may, for example, be performed by, with the assistance of, and/or under the control of one or more of the processor 110, memory 112, communication interface 114, user interface 116, or data interaction controller 118. Operation 800 may comprise providing a geohash-indexed data set. The processor 110, memory 112, communication interface 114, and/or data interaction controller 118 may, for example, provide means for performing operation 800. Operation 810 may comprise determining a density map indicating a density of indeed data items of the data set for each of a plurality of geohashes. The processor 110, memory 112, communication interface 114, and/or data interaction controller 118 may, for example, provide means for performing operation 810.

FIG. 9 illustrates a flowchart according to an example method for indexing a data item according to some example embodiments. The operations illustrated in and described with respect to FIG. 9 may, for example, be performed by, with the assistance of, and/or under the control of one or more of the processor 110, memory 112, communication interface 114, user interface 116, or data interaction controller 118. Operation 900 may comprise calculating a geohash for a data item to be indexed at a first level. The processor 110, memory 112, communication interface 114, and/or data interaction controller 118 may, for example, provide means for performing operation 900. Operation 910 may comprise indexing the data item with the geohash at the first level. The processor 110, memory 112, communication interface 114, and/or data interaction controller 118 may, for example, provide means for performing operation 910. Operation 920 may comprise calculating a geohash for the data item at a second level. The second level may be higher than the first level, and the geohash at the second level may be associated with a density map. The processor 110, memory 112, communication interface 114, and/or data interaction controller 118 may, for example, provide means for performing operation 920. Operation 930 may comprise incrementing a density count in the density map indicative of a density of data items indexed by the geohash at the first level. The processor 110, memory 112, communication interface 114, and/or data interaction controller 118 may, for example, provide means for performing operation 930.

FIG. 10 illustrates a flowchart according to an example method for querying a data set using a density map according to some example embodiments. The operations illustrated in and described with respect to FIG. 10 may, for example, be performed by, with the assistance of, and/or under the control of one or more of the processor 110, memory 112, communication interface 114, user interface 116, or data interaction controller 118. Operation 1000 may comprise receiving a query location. The processor 110, memory 112, communication interface 114, user interface 116, and/or data interaction controller 118 may, for example, provide means for performing operation 1000. Operation 1010 may comprise using a density map to query the geohash-indexed data set based on the query location. The processor 110, memory 112, communication interface 114, and/or data interaction controller 118 may, for example, provide means for performing operation 1010.

FIGS. 8-10 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
providing a geohash-indexed data set, the geohash-indexed data set comprising one or more indexed data items, each indexed data item associated with at least one of a plurality of geohashes;
determining, by a processor, a density map, the density map comprising numeric values corresponding to a number of the indexed data items of the data set present within an area defined by each geohash of the plurality of geohashes;
using the density map to query the geohash-indexed data set based at least in part on the query location comprises, prior to retrieving any the indexed data items:
determining, based at least in part on the density map, whether a number of data items that would be retrieved based at least in part on the query location would fail to satisfy a threshold parameter; and
only retrieving a data item based at least in part on the query location in response to determining that the number of data items that would be retrieved based at least in part on the query location would satisfy the threshold parameter;
receiving a query, the query identifying at least one query geohash from the plurality of geohashes;
determining at least one additional geohash other than the query geohash, the at least one additional geohash determined based at least in part by:
querying the density map to determine the number of indexed data items associated with the at least one additional geohash and
selecting the at least one additional geohash based on the number of indexed data items indicated by querying the density map; and
providing at least the at least one additional geohash in response to the query.

2. The method of claim 1, wherein determining the density map comprises determining a density of indexed data items of the data set for each of a plurality of geohashes at a first level, the method further comprising:
associating the density map with a geohash at a second level, the second level being higher than the first level and referencing a geographic region encompassing geographic regions referenced by the plurality of geohashes at the first level.

3. The method of claim 1, further comprising:
calculating a geohash for a data item to be indexed at a first level;
indexing the data item with the geohash at the first level;
calculating a geohash for the data item at a second level, the second level being higher than the first level, and wherein the geohash for the data item at the second level is associated with the density map; and
incrementing a density count in the density map indicative of a density of data items indexed by the geohash at the first level.

4. The method of claim 1, wherein using the density map to query the geohash-indexed data set comprises:
determining a geohash corresponding to the query location at a first level;
determining a geohash corresponding to the query location at a second level, the second level being higher than the first level, and wherein the geohash corresponding to the query location at the second level is associated with the density map;
reading at least a portion of the density map to determine densities of indexed items for the geohash corresponding to the query location at the first level and for one or more further geohashes at the first level, the one or more further geohashes at the first level referencing geographic regions adjacent to a geographic region referenced by the geohash corresponding to the query location at the first level; and
selecting to retrieve data items indexed by one or more of the geohash corresponding to the query location at the first level or one or more of the further geohashes at the first level based at least in part on the read densities.

5. The method of claim 4, wherein selecting to retrieve data items indexed by one or more of the geohash corresponding to the query location at the first level or one or more of the further geohashes at the first level based at least in part on the read densities comprises selecting to retrieve data items indexed from one or more geohashes cumulatively indexing enough data items to satisfy a search result quantity criterion.

6. The method of claim 4, wherein selecting to retrieve data items indexed by one or more of the geohash corresponding to the query location at the first level or one or more of the further geohashes at the first level based at least in part on the read densities comprises selecting to retrieve data items indexed by one or more geohashes indexing a number of data items satisfying a threshold number.

7. The method of claim 1, further comprising causing a user to be prompted to refine the query location in response to determining that the number of data items that would be retrieved based at least in part on the query location would not satisfy the threshold parameter.

8. An apparatus comprising at least one processor and at least one memory storing computer program code, wherein the at least one memory and stored computer program code are configured, with the at least one processor, to cause the apparatus to at least perform:
providing a geohash-indexed data set, the geohash-indexed data set comprising one or more indexed data items, each indexed data item associated with at least one of a plurality of geohashes;
determining, by a processor, a density map, the density map comprising numeric values corresponding to a number of the indexed data items of the data set present within an area defined by each geohash of the plurality of geohashes;

using the density map to query the geohash-indexed data set based at least in part on the query location comprises, prior to retrieving any the indexed data items:

determining, based at least in part on the density map, whether a number of data items that would be retrieved based at least in part on the query location would fail to satisfy a threshold parameter; and only retrieving a data item based at least in part on the query location in response to determining that the number of data items that would be retrieved based at least in part on the query location would satisfy the threshold parameter;

receiving a query, the query identifying at least one query geohash from the plurality of geohashes;

determining at least one additional geohash other than the query geohash, the at least one additional geohash determined based at least in part by:

querying the density map to determine the number of indexed data items associated with the at least one additional geohash and selecting the at least one additional geohash based on the number of indexed data items indicated by querying the density map; and providing at least the at least one additional geohash in response to the query.

9. The apparatus of claim 8, wherein determining the density map comprises determining a density of indexed data items of the data set for each of a plurality of geohashes at a first level, and wherein the at least one memory and stored computer program code are configured, with the at least one processor, to further cause the apparatus to perform:

associating the density map with a geohash at a second level, the second level being higher than the first level and referencing a geographic region encompassing geographic regions referenced by the plurality of geohashes at the first level.

10. The apparatus of claim 8, wherein the at least one memory and stored computer program code are configured, with the at least one processor, to further cause the apparatus to perform:

calculating a geohash for a data item to be indexed at a first level;

indexing the data item with the geohash at the first level;

calculating a geohash for the data item at a second level, the second level being higher than the first level, and wherein the geohash for the data item at the second level is associated with the density map; and incrementing a density count in the density map indicative of a density of data items indexed by the geohash at the first level.

11. The apparatus of claim 8, wherein using the density map to query the geohash-indexed data set comprises:

determining a geohash corresponding to the query location at a first level;

determining a geohash corresponding to the query location at a second level, the second level being higher than the first level, and wherein the geohash corresponding to the query location at the second level is associated with the density map;

reading at least a portion of the density map to determine densities of indexed items for the geohash corresponding to the query location at the first level and for one or more further geohashes at the first level, the one or more further geohashes at the first level referencing geographic regions adjacent to a geographic region referenced by the geohash corresponding to the query location at the first level; and selecting to retrieve data items indexed by one or more of the geohash corresponding to the query location at the first level or one or more of the further geohashes at the first level based at least in part on the read densities.

12. The apparatus of claim 11, wherein selecting to retrieve data items indexed by one or more of the geohash corresponding to the query location at the first level or one or more of the further geohashes at the first level based at least in part on the read densities comprises selecting to retrieve data items indexed from one or more geohashes cumulatively indexing enough data items to satisfy a search result quantity criterion.

13. The apparatus of claim 11, wherein selecting to retrieve data items indexed by one or more of the geohash corresponding to the query location at the first level or one or more of the further geohashes at the first level based at least in part on the read densities comprises selecting to retrieve data items indexed by one or more geohashes indexing a number of data items satisfying a threshold number.

14. A computer program product comprising at least one non-transitory computer-readable storage medium having computer-readable program instructions stored therein, the computer-readable program instructions comprising:

program instructions configured to provide a geohash-indexed data set, the geohash-indexed data set comprising one or more indexed data items, each indexed data item associated with at least one of a plurality of geohashes;

program instructions configured to determine a density map, the density map comprising numeric values corresponding to a number of the indexed data items of the data set present within an area defined by each of the plurality of geohashes;

program instructions configured to use the density map to query the geohash-indexed data set based at least in part on the query location comprises, prior to retrieving any the indexed data items:

program instructions configured to determine, based at least in part on the density map, whether a number of data items that would be retrieved based at least in part on the query location would fail to satisfy a threshold parameter; and program instructions configured to only retrieve a data item based at least in part on the query location in response to determining that the number of data items that would be retrieved based at least in part on the query location would satisfy the threshold parameter;

program instructions configured to receive a query, the query identifying at least one query geohash from the plurality of geohashes;

program instructions configured to determine at least one additional geohash other than the query geohash, the at least one additional geohash determined based at least in part using:

program instructions configured to query the density map to determine the number of indexed data items associated with the at least one additional geohash and program instructions configured to select the at least one additional geohash based on the number of indexed data items indicated by querying the density map; and program instructions configured to provide at least the at least one additional geohash in response to the query.

15. The computer program product of claim 14, further comprising:

program instructions configured calculate a geohash for a data item to be indexed at a first level;

program instructions configured to index the data item with the geohash at the first level;

program instructions configured to calculate a geohash for the data item at a second level, the second level being higher than the first level, and wherein the geohash for the data item at the second level is associated with the density map; and program instructions configured to increment a density count in the density map indicative of a density of data items indexed by the first geohash.

16. The computer program product of claim 14, further comprising:

program instructions configured to receive a query location; and program instructions configured to use the density map to query the geohash-indexed data set based at least in part on the query location.

* * * * *

UNITED STATES PATENT AND TRADEMARK OFFICE
CERTIFICATE OF CORRECTION

PATENT NO. : 8,983,953 B2  
APPLICATION NO. : 13/275955  
DATED : March 17, 2015  
INVENTOR(S) : Oikarinen et al.

It is certified that error appears in the above-identified patent and that said Letters Patent is hereby corrected as shown below:

Column 20,
Line 66, "determining, by a processor, a density map" should read --determining a density map--.

Signed and Sealed this
Twenty-ninth Day of December, 2015

Michelle K. Lee
*Director of the United States Patent and Trademark Office*